J. HINDMARSH.
Wheel-Cultivator.

No. 61,195.

Patented Jan. 15, 1867.

Witnesses:
F. A. Jackson.
Jas. A. Service.

Inventor:
John Hindmarsh
Per Munn & Co.
Attys.

United States Patent Office.

JOHN HINDMARSH, OF HENRY, ILLINOIS.

*Letters Patent No. 61,195, dated January 15, 1867.*

IMPROVEMENT IN CORN PLOUGHS.

*The Schedule referred to in these Letters Patent and making part of the same.*

TO ALL WHOM IT MAY CONCERN:

Be it known that I, JOHN HINDMARSH, of Henry, in the county of Marshall, and State of Illinois, have invented a new and improved Corn Plough; and I do hereby declare that the following is a full, clear, and exact description thereof, which will enable others skilled in the art to make and use the same, reference being had to the accompanying drawings, forming part of this specification, in which—

Figure 1:
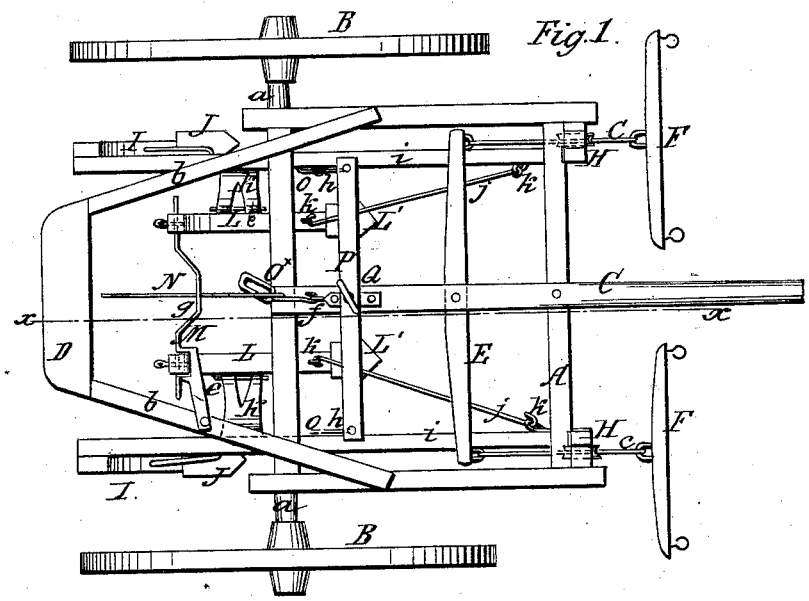

Figure 1 is a plan or top view of my invention.

Figure 2:
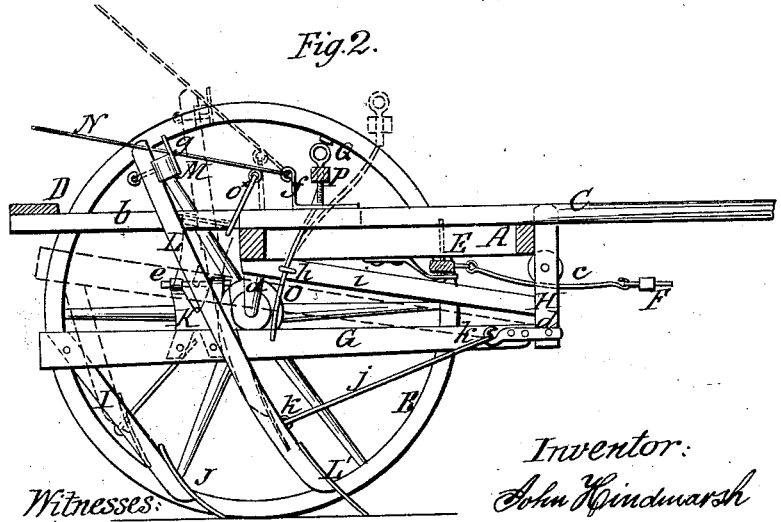

Figure 2, a side sectional view of the same, taken in the line $x\ x$, fig. 1.

Similar letters of reference indicate like parts.

This invention relates to a new and improved plough for cultivating corn and other crops, grain in hills or drills; and it consists in a novel manner of applying the ploughs to the machine whereby the former may be raised and lowered, and also moved laterally by the manipulation of a single lever, and the ploughs thereby placed under the complete control of the driver, and made to conform to the sinuosities of the rows of plants; the invention also admitting of the ploughs being set or adjusting to plough at a greater or less depth, as may be desired.

A represents a rectangular frame, which is mounted at its rear part on the wheels B B, the axles $a$ of which are bent or are of curved form, and attached to the under side of A. C is the draught-pole attached to the frame A, and $b\ b$ are two oblique bars, which project from the rear of A, and have the driver's seat D attached to their rear ends. E is a double-tree attached to the rear part of the draught-pole C, and having whiffle-trees, F F, attached to its ends by rods, $c\ c$. G G are plough beams, the front ends of which are attached by joints, $d\ d$, to the lower ends of pendants, H H, at the front part of the frame A, one at each side, said joints, $d\ d$, admitting of the rear parts of the beams G being raised and lowered. The rear end of each beam, G, has a standard, I, attached to it, and to the lower ends of these standards ploughs J are attached of the usual cultivator form. To the inner side of each beam, G, a bracket, K, is attached, said brackets inclining slightly inward from their lower to their upper ends, and having plough standards, L L, attached to them by hinges or joints, $e\ e$. The ploughs L', which are attached to L L, may be of the same shape, as those attached to the standards L. These standards, L L, extend upwards above the level of the driver's seat D, and they are connected at their upper ends by a cross-bar, M, the ends of which are pivoted to L L. N is a lever, the front end of which is connected by a joint, $f$, to the rear end of the draught-pole C, said lever passing through an opening, $g$, at the centre of M, and extending back within reach of the driver on seat D. Each plough beam, G, has a rod, O, attached to it, and these rods pass up through guides, $h\ h$, at the inner sides of brace-bars, $i\ i$, in the framing, and are connected at their upper ends by a cross-bar, P, through the centre of which a set-screw, Q, passes. By adjusting this screw, Q, the depth of the penetration of the ploughs may be regulated as desired, and it will be seen that the driver, by manipulating the lever N, may raise and lower all the ploughs, and move the inner ones laterally to conform to the sinuosities of the rows of plants. The lever N has a pendent standard, O*, attached, which, when the ploughs are raised, rests on the rear part of the draught-pole and sustains the ploughs in an elevated position. The standards L L are braced by rods, $j$, from the front parts of the beams G G, said rods being connected by joints $k$ to G and L.

Having thus described my invention, I claim as new, and desire to secure by Letters Patent—

1. The lever N, in combination with the standard O*, for sustaining the ploughs in an elevated position, when required.

2. The rods O O, plough beams G G, cross-bar P, and screw Q, combined and operating as described.

3. The combination of the plough beams G G, standards L L, lever N, and brace-rods $j$, all arranged and applied to a mounted frame, A, to operate in the manner substantially as and for the purpose specified.

JOHN HINDMARSH.

Witnesses:
FRED. S. POTTER,
P. S. PERLEY.